(12) United States Patent
Kalyanpur et al.

(10) Patent No.: US 11,048,737 B2
(45) Date of Patent: Jun. 29, 2021

(54) CONCEPT IDENTIFICATION IN A QUESTION ANSWERING SYSTEM

(71) Applicant: International Business Machines Corporation, Armonk, NY (US)

(72) Inventors: Aditya A. Kalyanpur, Westwood, NJ (US); James W. Murdock, IV, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 935 days.

(21) Appl. No.: 14/941,701

(22) Filed: Nov. 16, 2015

(65) Prior Publication Data
US 2017/0140034 A1    May 18, 2017

(51) Int. Cl.
| | |
|---|---|
| *G06F 16/33* | (2019.01) |
| *G06N 5/02* | (2006.01) |
| *G06N 20/00* | (2019.01) |
| *G06N 5/04* | (2006.01) |
| *G06N 7/00* | (2006.01) |
| *G06F 40/169* | (2020.01) |
| *G06F 40/205* | (2020.01) |

(52) U.S. Cl.
CPC ......... *G06F 16/334* (2019.01); *G06F 40/169* (2020.01); *G06F 40/205* (2020.01); *G06N 5/02* (2013.01); *G06N 5/04* (2013.01); *G06N 7/005* (2013.01); *G06N 20/00* (2019.01)

(58) Field of Classification Search
CPC ............. G06F 17/30675; G06F 16/334; G06F 40/205; G06F 40/169; G06N 20/00; G06N 5/02; G06N 5/04; G06N 7/005
See application file for complete search history.

(56) References Cited

U.S. PATENT DOCUMENTS

| | | | |
|---|---|---|---|
| 8,005,825 B1 * | 8/2011 | Ghosh ................... | G06F 16/951 707/723 |
| 8,275,803 B2 | 9/2012 | Brown et al. | |
| 9,348,920 B1 * | 5/2016 | Kesin .................... | G06F 16/334 |
| 2005/0086222 A1 * | 4/2005 | Wang ................ | G06F 17/30716 |
| 2006/0167930 A1 * | 7/2006 | Witwer ................ | G06F 16/355 |

(Continued)

OTHER PUBLICATIONS

Disclosed Anonymously, "Method of Computing Relevancy Score in a Question and Answering System," IP.com, IP.com No. 000222407, Publication Date: Oct. 2, 2012; 4 pages.

(Continued)

*Primary Examiner* — Jensen Hu
(74) *Attorney, Agent, or Firm* — Cantor Colburn LLP; Ingrid M Foerster

(57) ABSTRACT

According to an aspect, concept identification in a question answering system includes receiving, at a computer processor, a text span as a subject of a search query. An aspect also includes searching a title-oriented document (TOD) corpus for the text span, and matching, by the computer processor, concepts in title-oriented documents TODs of the TOD corpus to the span of text. The matching of the concepts includes decomposing the title-oriented documents into a series of passages, scoring the passages identified as possible matches, and merging and ranking results of the scoring to produce final scores for each concept associated with the title-oriented documents.

17 Claims, 6 Drawing Sheets

(56) References Cited

U.S. PATENT DOCUMENTS

| | | | | |
|---|---|---|---|---|
| 2009/0287678 A1* | 11/2009 | Brown | ............... | G06F 17/30654 |
| 2010/0057664 A1* | 3/2010 | Sweeney | ................ | G06N 5/022 |
| | | | | 706/55 |
| 2011/0119282 A1* | 5/2011 | Gorman | ............ | G06F 17/30401 |
| | | | | 707/755 |
| 2012/0077178 A1* | 3/2012 | Bagchi | ..................... | G09B 7/00 |
| | | | | 434/362 |
| 2012/0078895 A1* | 3/2012 | Chu-Carroll | ...... | G06F 17/30637 |
| | | | | 707/728 |
| 2012/0084293 A1* | 4/2012 | Brown | ..................... | A61B 5/00 |
| | | | | 707/741 |
| 2012/0130997 A1* | 5/2012 | Risvik | ................... | G06F 16/951 |
| | | | | 707/723 |
| 2012/0301864 A1 | 11/2012 | Bagchi et al. | | |
| 2014/0074826 A1 | 3/2014 | Cooper et al. | | |
| 2014/0164303 A1 | 6/2014 | Bagchi et al. | | |
| 2014/0164352 A1* | 6/2014 | Denninghoff | ...... | H03H 9/02622 |
| | | | | 707/711 |
| 2014/0258286 A1 | 9/2014 | Brown et al. | | |

OTHER PUBLICATIONS

Disclosed Anonymously, "Technique for Predictive Analysis and Subsequent Ranking of Candidates for Online Social Q& A Interaction," IP.com, IP.com No. 00233143; Publication Date: Nov. 25, 2013; 5 pages.

* cited by examiner

300

- TITLE: "Dyspnea under exertion" ~302
- SECTION: ALTERNATE NAMES ~304A
  - Shortness of breath under exertion
  - ...
- SECTION: DEFINITIONS ~304B
  - Shortness of breath (due to cardiovascular and respiratory disorders) elicited by physical activity.
  - Shortness of breath which occurs with effort, often a sign of heart failure or ischemia
  - ...
- SECTION: TYPES ~304C
  - Finding
- SECTION: MENTIONS ~304D
  - Patient experienced <u>difficulty breathing when exercising on the treadmill</u>
  - ...

FIG. 3

- INPUT: "Eating more" ~402A
  - OUTPUTS: ~406A ~408A ~410A ~412A
    - 0.82 : Hyperphagia [[disease]] {"ingestion of a greater than optimal quantity of food"}
    - 0.75 : Eating Disorders [[disease]] {"Eating disorders are serious behavior problems..."}
    - 0.54 : Binge eating disorder [[disease]] {"Eating excessive quantities of food, often after stressful events. Compare BULIMIA"}

- INPUT: "Difficulty walking" ~402B
  - OUTPUTS: ~406B ~408B ~410B ~412B
    - 0.81 : Mobility Limitation [[finding]] {"Difficulty in moving from place to place"}
    - 0.72 : Gait abnormality [[finding]] {"A finding referring to walking difficulties"}

CONCEPT IDENTIFICATION IN A QUESTION ANSWERING SYSTEM

BACKGROUND

The present disclosure relates generally to natural language processing, and more specifically, to using a probabilistic technique (e.g., a deep learning question-answering pipeline) for concept identification in text.

An information retrieval computer system typically receives a query, identifies keywords in the query, searches documents for the keywords, and ranks results of the searching to identify best matches. Some information retrieval computer systems output a list of best matching results to a user, such that the user can then attempt to determine if desired information can be found in the results. Keyword searching often uses frequency-based scoring for words or synonyms, but such searches typically fail to consider the context of particular words. More advanced question answering computer systems typically employ natural-language processing (NPL) that returns a highest scoring answer to a question in a natural language format. NLP techniques, which are also referred to as text analytics, infer the meaning of terms and phrases by analyzing their syntax, context, and usage patterns.

One of the core challenges of knowledge extraction from unstructured text is to identify concepts in the underlying text. Concepts of interest are often defined in a domain-specific ontology or knowledge base. However, human language is so complex, variable (there are many different ways to express the same meaning), and polysemous (the same word or phrase may mean many things in different contexts) that NPL presents an enormous technical challenge.

SUMMARY

Embodiments include a method, system, and computer program product for concept identification in a question answering system. In one aspect, a method includes receiving, at a computer processor, a text span as a subject of a search query. The method also includes searching a title-oriented document (TOD) corpus for the text span, and matching, by the computer processor, concepts in title-oriented documents (TODs) of the TOD corpus to the span of text. The matching of the concepts includes decomposing the title-oriented documents into a series of passages, scoring the passages identified as possible matches, and merging and ranking results of the scoring to produce final scores for each concept associated with the title-oriented documents.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts an example title-oriented document (TOD) of a TOD corpus in accordance with an embodiment;

FIG. 4 depicts a sample application of the concept identification process in accordance with an embodiment;

DETAILED DESCRIPTION

Embodiments disclosed herein relate to identifying concepts in a question answering system. A task known in natural language processing (NLP) is term canonicalization, which is the process of identifying domain-specific concepts for a given span of text. The techniques described herein provide a flexible solution wherein concept identification is based on an overall score rather than a rigid rule-based approach. In an exemplary embodiment, title-oriented documents (TODs) for each concept identified in a domain are created and used as a corpus from which concepts are matched to a given span of text. In an embodiment, the matching includes using the span of text to search for relevant TODs, decomposing the relevant TODs into a series of passages, scoring the passages, and merging and ranking the results to produce final scores for each concept associated with the TODs. The ranked list of concepts may be used for the term canonicalization.

Figure 1:
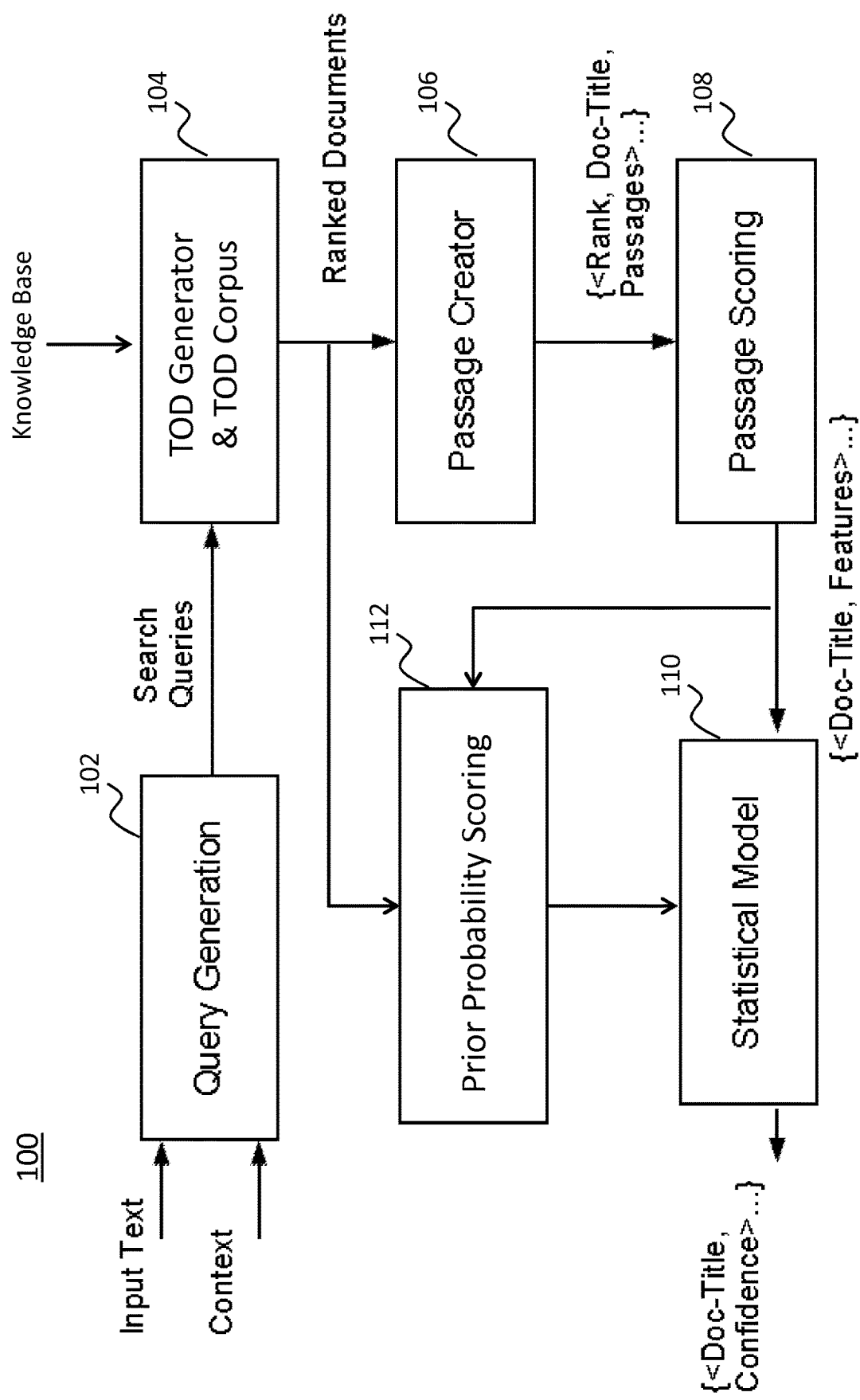
FIG. 1 depicts a block diagram illustrating architectural components and data flow for concept identification in accordance with an embodiment.

FIG. 1 depicts a block diagram 100 of architectural components and a dataflow for concept identification in accordance with an embodiment. The components include a query generation component 102, a title-oriented document (TOD) generator and TOD corpus 104, a passage creator component 106, a passage scoring component 108, and a statistical model 110.

The query generation component 102 receives an input containing a text span and, optionally, its context and a series of queries is run against the TOD corpus 104 to find potentially matching concept documents. The series of queries may be particularly configured for different sections of a pseudo-document in the TOD corpus 104, as will be described further herein.

The TOD corpus 104 contains a single pseudo-document for each concept in a knowledge base. The knowledge base may be any type of domain of centralized managed data, e.g., WIKIPEDIA. The concept identification processes described herein utilize pseudo-documents as a placeholder for all of the information that is relevant for matching the concept against the input text. Pseudo-documents are described further in FIG. 3. The output of the TOD corpus 104 includes potentially matching concept documents.

The passage creator component 106 decomposes each pseudo-document from the output of the TOD corpus 104 into a series of passages to match against the input text. The passage scoring component 108 includes a series of passage-scoring algorithms (e.g., as used in DeepQA), each of which produces features that score how well each passage produced from the passage creator component 106 matches the input text and context.

The statistical model 110 may be implemented using machine learning based merging and ranking (e.g., as done in DeepQA), which merges the features produced from the passage scoring component 108. The statistical model component 110 learns a classifier using the features to rank the output concepts given the input. Learning is implemented using pre-compiled training data. Output from the statistical model 110 includes the document title of the pseudo-document contained in the results, as well as a confidence score.

Figure 2:
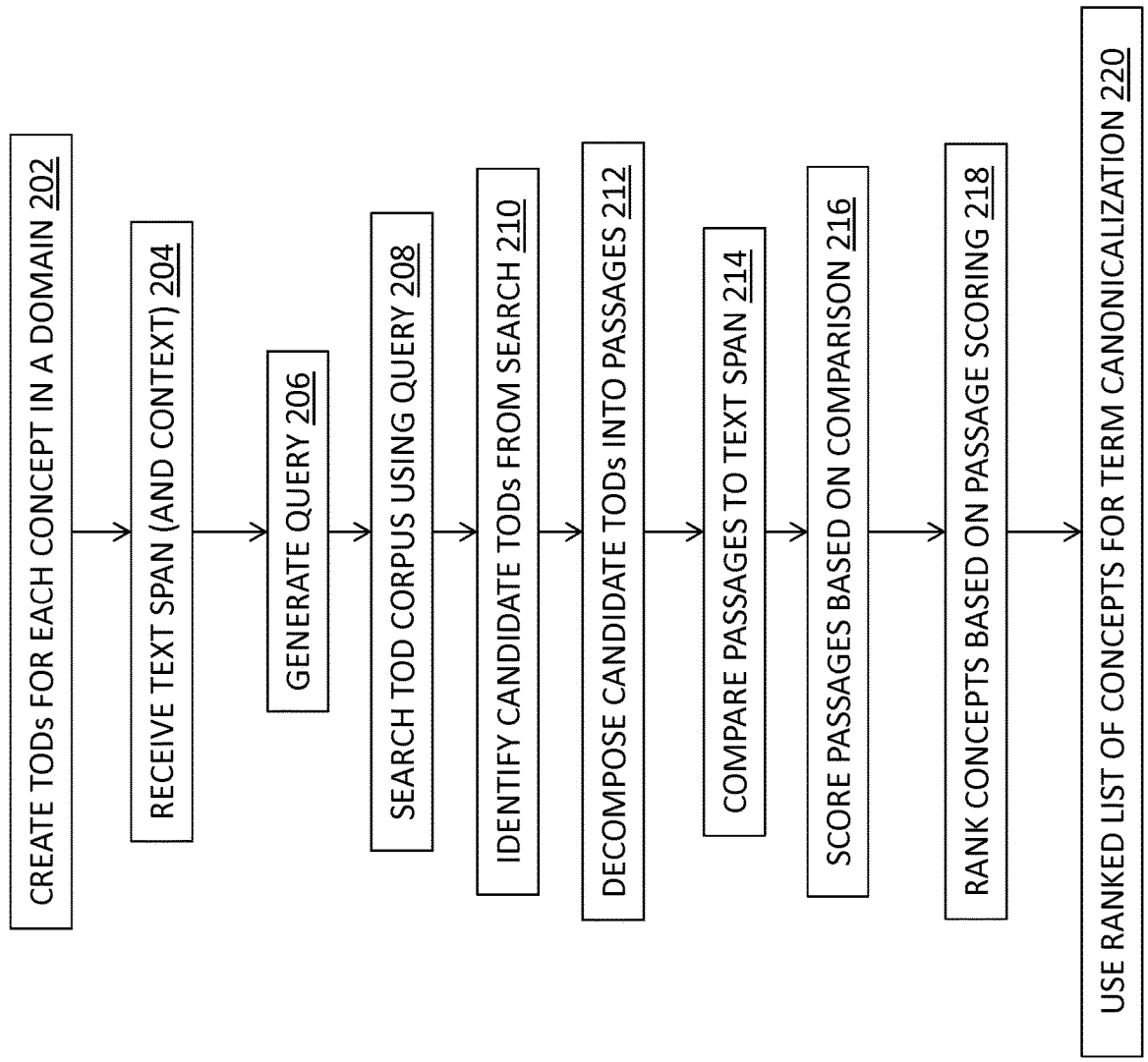
FIG. 2 depicts a flow diagram of a process for implementing concept identification in accordance with an embodiment.

Turning now to FIG. 2, a flow diagram describing a process for concept identification will now be described in accordance with an embodiment. The process of FIG. 2 assumes that a knowledge base has been selected as a domain for which search queries are generated. At block 202, a TOD is created for each concept in the domain. The TOD is created as a pseudo-document, a sample of which is shown in FIG. 3. The pseudo-document contains elements relevant for matching an input text in a single location. As shown in FIG. 3, the pseudo-document 300 is related to a medical condition and includes a title 302, followed by sections 304A-304D.

Section 304A lists any variants or alternate forms (e.g., abbreviations or expansions) of the concept.

Section 304B lists definitions of the concept. This information may be obtained, e.g., from sources such as a glossary or PRISMATIC.

Section 304C lists the concept type, which may be derived from an ontology or PRISMATIC. For example, a concept that indicates a disease has a type 'disease.' A concept that indicates a finding has a type 'finding.'

Section 302D lists mentions, which may include examples of how the concept is mentioned in text of the corpus. Contextual information of the corpus may be used to determine the mentions. As shown in section 302D of FIG. 3, the actual contextual information is included in the pseudo-document 300.

Each of the different forms of information identified in the sections is marked as a separate field in the pseudo-document. This enables the query generation component 102, the passage creator component 106, and the passage scoring component 108 to treat the different pieces of information differently (e.g., by creating more focused queries or by decomposing passages differently, or by scoring alternative names differently from the definitions).

The passage creator component 106 creates a separate passage for each field entry in the pseudo-document. For example, if a pseudo-document contains two fields (Alternate Names 304A and Definitions 304B), and each of these fields has five entries each (e.g., five alternate names and five definitions), then the passage creator component 106 would create ten passages in all. Each passage object has an annotation for the field it came from, and this information is used by the passage scoring component 108 to create appropriate features for the final classification system.

Figure 5:
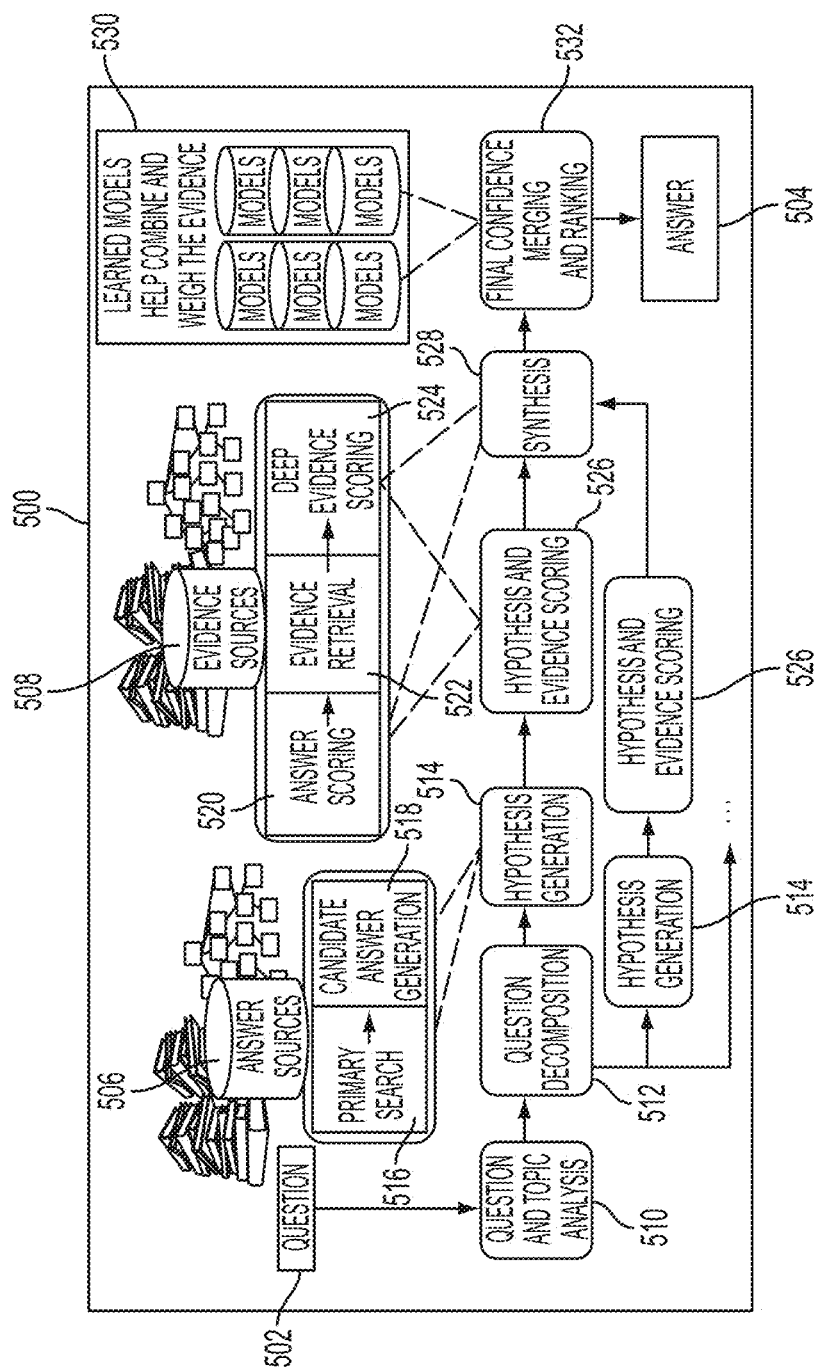
FIG. 5 depicts a high-level block diagram of a question-answer (QA) framework.

The processes performed by the passage scoring component 108 and the statistical model 110 can be implemented using frameworks and algorithms present in IBM's Watson DeepQA system. For example, the Watson DeepQA system contains a suite of passage scoring algorithms such as Passage-Term-Match, Skip-Bigram, LFACS, Text-Alignment, etc., to match each passage to the text input. The Watson DeepQA system architecture is shown in FIG. 5.

Returning to FIG. 2, a text span (and optionally context of the text span) is received by the query generator component 102, and a query is constructed from the text span and context at block 206. The query may be configured such that it is directed to or focused on particular sections (302, 304A-304D) of pseudo-documents 300 in the TOD corpus 104.

At block 208, the TOD corpus 104 is searched using the query, and relevant TODs are identified from the search at block 210. These TODs are referred to as candidate TODs. The candidate TODs are ranked according to relevance. At block 212, the passage creator 106 decomposes the candidate TODs into passages, and the individual passages are compared to the text span at block 214 and scored (passage scoring 108) based on the comparison at block 216, as well as the ranking from the search.

The concepts are ranked according to the collective scoring of corresponding passages at block 218.

The ranked list of concepts output from the merging and scoring can be used for the term canonicalization at block 220.

In an embodiment, the concept identification processes may employ an additional feature that operates in parallel with the passage generator and scoring functions described in FIG. 2. The concept identification processes include a prior probability scoring component 112 (FIG. 1), which computes indicators of the likelihood that each concept will appear in the search results, independent of context. The component 112 provides scoring of the prior probability of the candidate concept being the correct answer to the query. This component 112 operates on the ranked TODs from the corpus 104 and the output of the passage scoring 108.

This feature complements the features produced by the passage scoring component. For example, if the input text is "Toronto" and the system is trying to determine whether this text is referring to Toronto, Ontario or Toronto, Ohio, it helps to know that references to "Toronto" are much more likely to refer to Toronto, Ontario than they are to Toronto, Ohio. These features complement the context-dependent features in that a very strong passage scoring match can overwhelm them (e.g., if "Toronto" appears in a passage about Ohio and towns near Toronto, Ohio and the county where Toronto, Ohio is located, then the context match will be so strong that it will overwhelm the prior probability. However, if "Toronto" appears in a passage that matches the pseudo-documents for Toronto, Ohio to a slightly stronger degree than it matches Toronto, Ontario, then the system can be more influenced by the prior belief that Toronto, Ontario is a more likely concept to occur). One example of a useful prior probability feature is the number of links that the concept has in the source knowledge base that was used to generate the corpus: concepts that are more popular and more well known are more likely to have known connections to other concepts. Another example of a useful prior probability feature is the number of words in the TOD about that concept. Another example is the total number of variant forms of the concept, since popular concepts are more likely to have common known nicknames and alternative expressions.

Turning now to FIG. 4, an interface 400 illustrating sample inputs (e.g., text span) 402A and 402B and final outputs (concepts) 404A and 404B is shown in an embodiment. For each input 402, one or more outputs 404 are shown, each of which is ranked with corresponding scores 406A and 406B. In this embodiment, a highest ranking score is 1.0. Following the scores in the outputs are corresponding concepts 408A and 408B, concept types 410A and 410B, and concept definitions and/or context information 412A and 412B.

Turning now to FIG. 5, a high-level block diagram of a question-answer (QA) framework 500 where embodiments described herein can be utilized is generally shown.

The QA framework 500 can be implemented to generate a ranked list of answers 504 (and a confidence level associated with each answer) to a given question 502. In an embodiment, general principles implemented by the framework 500 to generate answers 504 to questions 502 include massive parallelism, the use of many experts, pervasive confidence estimation, and the integration of shallow and deep knowledge. In an embodiment, the QA framework 500 shown in FIG. 5 is implemented by the Watson™ product from IBM.

The QA framework 500 shown in FIG. 5 defines various stages of analysis in a processing pipeline. In an embodiment, each stage admits multiple implementations that can produce alternative results. At each stage, alternatives can be independently pursued as part of a massively parallel computation. Embodiments of the framework 500 don't assume that any component perfectly understands the question 502 and can just look up the right answer 504 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 5, the question and topic analysis 510 is performed and used in question decomposition 512. Hypotheses are generated by the hypothesis generation block 514 which uses input from the question decomposition 512, as well as data obtained via a primary search 516 through the answer sources 506 and candidate answer generation 518 to generate several hypotheses. Hypothesis and evidence scoring 526 is then performed for each hypothesis using evidence sources 508 and can include answer scoring 520, evidence retrieval 522 and deep evidence scoring 524.

A synthesis 528 is performed of the results of the multiple hypothesis and evidence scorings 526. Input to the synthesis 528 can include answer scoring 520, evidence retrieval 522, and deep evidence scoring 524. Learned models 530 can then be applied to the results of the synthesis 528 to generate a final confidence merging and ranking 532. A ranked list of answers 504 (and a confidence level associated with each answer) is then output.

Evidence retrieval and scoring plays a key role in the QA framework 500 shown in FIG. 5. Embodiments of identifying concepts can be utilized by the QA framework 500 to improve scoring results.

The framework 500 shown in FIG. 5 can utilize embodiments of identifying concepts described herein to create learned models 530 by training statistical machine learning algorithms on prior sets of questions and answers to learn how best to weight each of the hundreds of features relative to one another. These weights can be used at run time to balance all of the features when combining the final scores for candidate answers to new questions 502. In addition, embodiments can be used to generate a KB based on a corpus of data that replaces or supplements commercially available KBs.

Figure 6:
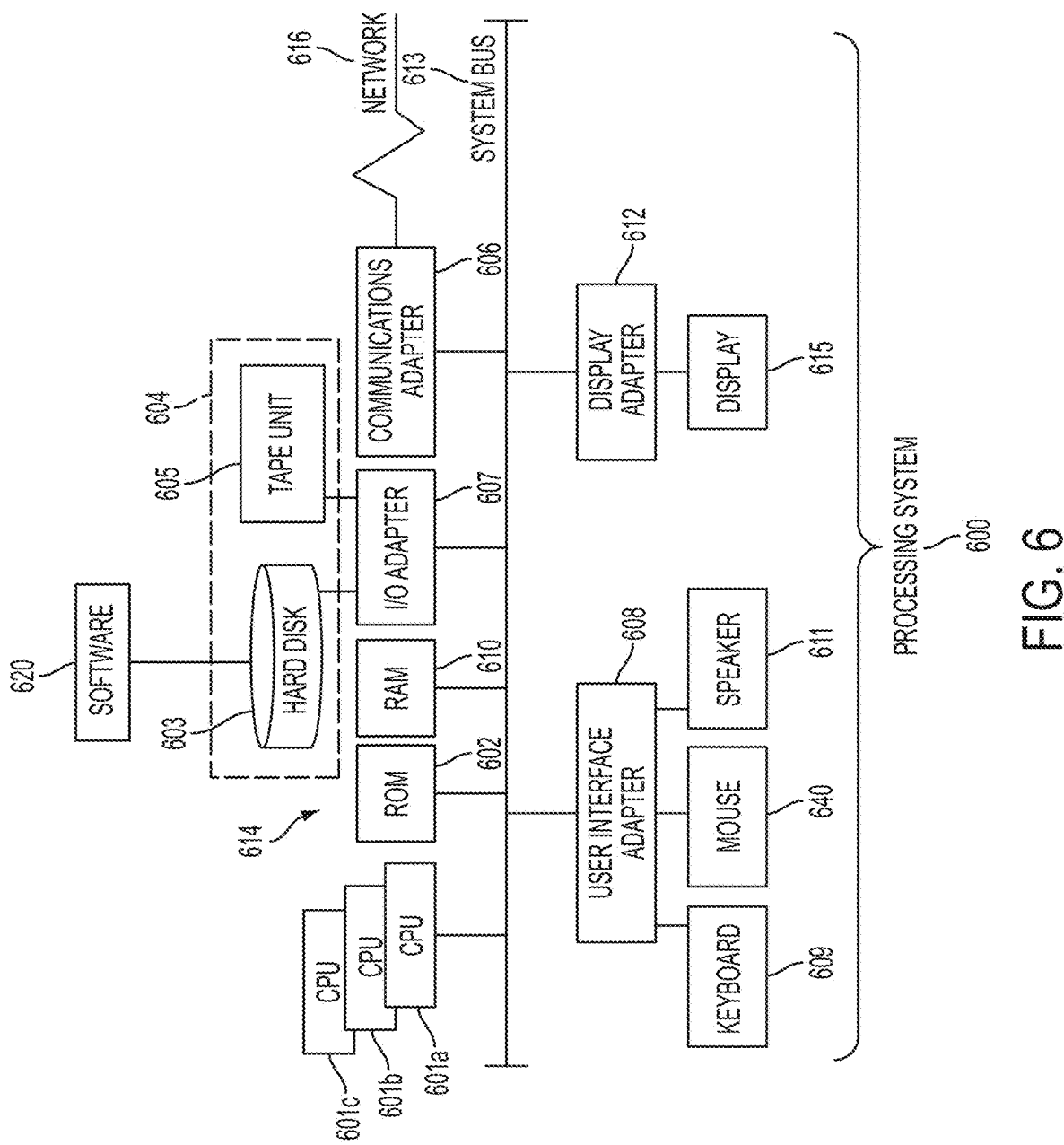
FIG. 6 depicts a processing system in accordance with an embodiment.

Referring now to FIG. 6, there is shown an embodiment of a processing system 600 for implementing the teachings herein. The processing system 600 is an example of a question answering computer system as previously referenced herein. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as instructions for execution by the processors 601 to perform a method, such as the process flow 400 of FIG. 4. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

Technical effects and benefits include concept identification in a question answering system. The techniques create title-oriented documents (TODs) for each concept identified in a domain and are used as a corpus from which concepts are matched to a given span of text. The matching includes using the span of text to search for relevant TODs, decomposing the relevant TODs into a series of passages, scoring the passages, and merging and ranking the results to produce final scores for each concept associated with the TODs. The ranked list of concepts may be used for the term canonicalization.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for concept identification in a question answering system, the method comprising:
    receiving, at a computer processor, a text span as a subject of a search query;
    selecting a knowledge base as a domain for the search query;
    creating, for each concept in the domain, a unique title-oriented document (TOD), each TOD comprising a pseudo-document having two or more separately indexed fields, wherein a first field comprises a definition for the concept and a second field comprises an example text employing the concept;
    matching, by the computer processor, concepts in the TODs to the span of text, the matching comprising:
    decomposing each TOD into a series of passages;
    scoring the passages identified as possible matches, wherein the scoring is based on a context of the search query;
    calculating a probability of each concept being included in a search result, wherein the probability is independent of the context of the search query;
    merging and ranking results of the scoring and the probability calculations to produce final scores for each concept associated with the title-oriented documents; and
    providing a ranked list of answers to the search query based upon the concepts matched to the text span,
    wherein the series of passages include annotations to corresponding fields in the TODs.

2. The method of claim 1, wherein each TOP further comprises:
    a third field that identifies an alternative descriptor of the concept;
    a fourth field that identifies a type of the concept; and
    a fifth field that identifies contextual information from the knowledge base with respect to the concept.

3. The method of claim 2, wherein the search query is configured to search user-selectable sections for the text span via the corresponding fields.

4. The method of claim 2, wherein the decomposing the TODs into a series of passages includes creating a passage for each entry of each respective field.

5. The method of claim 2, further comprising:
    ranking the TODs according to a relevance determination with respect to the text span;
    receiving features produced from scoring the passages identified as possible matches; and
    determining, via a prior probability analysis, that a particular concept of one of the TODs for which a final score is generated has a threshold likelihood of occurring in response to a search for the text span;
    wherein a final score, resulting from the merging and ranking, of the particular concept is elevated in response to the determining.

6. The method of claim 1, wherein the ranked results of the scoring are used for term canonicalization.

7. A computer program product comprising:
    a tangible storage medium readable by a processing circuit of a question answering computer system and storing instructions for execution by the processing circuit to perform a method comprising:
    receiving a text span as a subject of a search query;
    selecting a knowledge base as a domain for the search query;
    creating, for each concept in the domain, a unique title-oriented document (TOD), each TOD comprising a pseudo-document having two or more separately indexed fields, wherein a first field comprises a definition for the concept and a second field comprises an example text employing the concept;
    matching concepts in the TODs to the span of text, the matching comprising:
    decomposing each TOD into a series of passages;
    scoring the passages identified as possible matches, wherein the scoring is based on a context of the search query;
    calculating a probability of each concept being included in a search result, wherein the probability is independent of the context of the search query;
    merging and ranking results of the scoring and the probability calculations to produce final scores for each concept associated with the title-oriented documents; and
    providing a ranked list of answers to the search query based upon the concepts matched to the text span,
    wherein the series of passages include annotations to corresponding fields in the TODs.

8. The computer program product of claim 7, wherein each TOD further comprises:
    a third field that identifies an alternative descriptor of the concept;
    a fourth field that identifies a type of the concept; and
    a fifth field that identifies contextual information from the knowledge base with respect to the concept.

9. The computer program product of claim 8, wherein the search query is configured to search user-selectable sections for the text span via the corresponding fields.

10. The computer program product of claim 8, wherein the decomposing the TODs into a series of passages includes creating a passage for each entry of each respective field.

11. The computer program product of claim 8, wherein the method further comprises:
    ranking the TODs according to a relevance determination with respect to the text span;
    receiving features produced from scoring the passages identified as possible matches; and
    determining, via a prior probability analysis, that a particular concept of one of the TODs for which a final score is generated has a threshold likelihood of occurring in response to a search for the text span;
    wherein a final score, resulting from the merging and ranking, of the particular concept is elevated in response to the determining.

12. The computer program product of claim 7, wherein the ranked results of the scoring are used for term canonicalization.

13. A system comprising:
- a memory having computer readable instructions; and
- a processor for executing the computer readable instructions, the computer readable instructions including:
- receiving a text span as a subject of a search query;
- selecting a knowledge base as a domain for the search query;
- creating, for each concept in the domain, a unique title-oriented document (TOD), each TOD comprising a pseudo-document having two or more separately indexed fields, wherein a first field comprises a definition for the concept and a second field comprises an example text employing the concept;
- matching concepts in the TODs to the span of text, the matching comprising:
- decomposing each TOD into a series of passages;
- scoring the passages identified as possible matches, wherein the scoring is based on a context of the search query;
- calculating a probability of each concept being included in a search result, wherein the probability is independent of the context of the search query;
- merging and ranking results of the scoring and the probability calculations to produce final scores for each concept associated with the title-oriented documents; and
- providing a ranked list of answers to the search query based upon the concepts matched to the text span, wherein the series of passages include annotations to corresponding fields in the TODs.

14. The system of claim 13, wherein each TOP further comprises:
- a third field that identifies an alternative descriptor of the concept;
- a fourth field that identifies a type of the concept; and
- a fifth field that identifies contextual information from the knowledge base with respect to the concept.

15. The system of claim 14, wherein the search query is configured to search user-selectable sections for the text span via the corresponding fields.

16. The system of claim 14, wherein the decomposing the TODs into a series of passages includes creating a passage for each entry of each respective field.

17. The system of claim 14, wherein the computer readable instructions further include:
- ranking the TODs according to a relevance determination with respect to the text span;
- receiving features produced from scoring the passages identified as possible matches; and
- determining, via a prior probability analysis, that a particular concept of one of the TODs for which a final score is generated has a threshold likelihood of occurring in response to a search for the text span;
- wherein a final score, resulting from the merging and ranking, of the particular concept is elevated in response to the determining.

* * * * *